US008967957B2

(12) United States Patent
Itzel et al.

(10) Patent No.: US 8,967,957 B2
(45) Date of Patent: Mar. 3, 2015

(54) ROTATING AIRFOIL COMPONENT OF A TURBOMACHINE

(75) Inventors: Gary Michael Itzel, Simpsonville, SC (US); Christopher Michael Penny, Greer, SC (US); Aaron Ezekiel Smith, Simpsonville, SC (US); Kevin Leon Bruce, Greer, SC (US)

(73) Assignee: General Electric Company, Schenectady, NY (US)

( * ) Notice: Subject to any disclaimer, the term of this patent is extended or adjusted under 35 U.S.C. 154(b) by 608 days.

(21) Appl. No.: 13/288,100

(22) Filed: Nov. 3, 2011

(65) Prior Publication Data

US 2013/0115096 A1   May 9, 2013

(51) Int. Cl.
*F04D 29/08* (2006.01)
*F01D 11/02* (2006.01)
*F01D 5/28* (2006.01)

(52) U.S. Cl.
CPC ............... *F01D 11/02* (2013.01); *F01D 5/288* (2013.01)
USPC .................................... 415/174.3; 415/174.5

(58) Field of Classification Search
CPC ......... F01D 5/081; F01D 5/087; F01D 5/286; F01D 25/007; F01D 11/00; F01D 11/001; C23C 28/022; F05D 2260/231; F05D 2230/90
USPC ............. 415/173.7, 174.2, 174.3, 174.5, 177; 416/95, 193 A, 248
See application file for complete search history.

(56) References Cited

U.S. PATENT DOCUMENTS

| 5,211,536 | A | 5/1993 | Ackerman et al. |
| 5,224,822 | A | 7/1993 | Lenahan et al. |
| 6,418,618 | B1 | 7/2002 | Burdgick |
| 6,811,373 | B2 * | 11/2004 | Tomita et al. ............. 415/173.1 |
| 7,465,152 | B2 | 12/2008 | Nigmatulin |
| 7,540,709 | B1 * | 6/2009 | Ebert .......................... 415/173.7 |
| 2006/0110254 | A1 * | 5/2006 | Itzel et al. ................. 416/193 A |
| 2007/0264126 | A1 * | 11/2007 | Box et al. .................. 416/241 R |
| 2010/0074734 | A1 * | 3/2010 | Little ......................... 415/173.7 |

FOREIGN PATENT DOCUMENTS

EP          1978210 A1 * 10/2008   ............. C23C 4/02

* cited by examiner

*Primary Examiner* — Dwayne J White
*Assistant Examiner* — Jason Fountain
(74) *Attorney, Agent, or Firm* — Hartman Global IP Law; Gary M. Hartman; Michael D. Winter

(57) ABSTRACT

A rotating airfoil component equipped with one or more angel wings that inhibit the ingress of a hot working fluid into interior regions of a turbomachine in which the component is installed. The component includes an airfoil and a feature for mounting the component to enable rotation of the component within the turbomachine. An angel wing projects from the component to have a first surface facing the airfoil, an oppositely-disposed second surface facing the mounting feature, and at least one lateral surface therebetween. A thermal-insulating coating system is present on the first surface to inhibit heat transfer from the working fluid to the angel wing but not on the second or lateral surfaces so as not to inhibit heat transfer from the second and lateral surfaces of the angel wing.

20 Claims, 4 Drawing Sheets

ROTATING AIRFOIL COMPONENT OF A TURBOMACHINE

BACKGROUND OF THE INVENTION

The present invention generally relates to structures subject to high stresses and high temperatures, such as rotating components of gas turbines and other turbomachinery. More particularly, this invention relates to a method of inhibiting heat transfer to angel wings of turbine buckets (blades) so as to reduce the temperature of the angel wings and/or reduce the cooling requirements of the angel wings.

Buckets (blades), nozzles (vanes), and other components located in the hot gas path within turbine sections of gas turbines are typically formed of nickel-, cobalt- or iron-base superalloys with desirable mechanical and environmental properties for turbine operating temperatures and conditions. Because the efficiency of a gas turbine is dependent on its operating temperatures, there is a demand for components that are capable of withstanding increasingly higher temperatures. As the maximum local temperature of a component approaches the melting temperature of its alloy, forced air cooling becomes necessary. For this reason, airfoils of gas turbine buckets and nozzles often require complex cooling schemes in which air is forced through internal cooling passages within the airfoil and then discharged through cooling holes at the airfoil surface.

FIG. 1 schematically represents an axial cross-section of a turbine section 10 of a land-based gas turbine engine. The turbine section 10 comprises multiple turbine stages, represented as the first and second stages immediately downstream of the combustor (not shown) of the turbine engine. Each stage of the turbine section 10 comprises an annular array of circumferentially-spaced buckets 12 (only one bucket 12 of each stage is represented in FIG. 1) and a nozzle assembly 14 made up of an annular array of circumferentially-spaced vanes 16 (only one vane 16 of each stage is represented in FIG. 1). The nozzle assemblies 14 and their vanes 16 are statically mounted within the turbine section 10, whereas the buckets 12 are mounted on a rotating component, commonly referred to as a wheel 18, of the gas turbine to enable rotation of the buckets 12 within the gas turbine and relative to the nozzle assemblies 14. The vanes 16 define airfoils that extend between inner and outer platforms (or bands) 20 of the nozzle assemblies 14. As represented in FIG. 1, each bucket 12 comprises an airfoil 24 extending from a shank 26 in a radially outward direction 22 of the turbine section 10. The buckets 12 can be conventionally anchored to their respective wheels 18, for example, with dovetails (not shown) formed on their shanks 16 and received in complementary slots defined in the circumference of each wheel 18. The buckets 12 and nozzle assemblies 14 are directly subjected to the hot gas path 32 within the turbine section 10. In particular, the airfoils 24 of the buckets 12 and the vanes 16 of the nozzle assemblies 14 are impinged by the hot combustion gases in the hot gas path 32 through the gas turbine.

Impingement of the bucket airfoils 24 and nozzle vanes 16 by the combustion gases results in upstream airfoil wakes and downstream airfoil bow waves, which tend to produce pressure wakes within the hot gas path 32 that cause hot combustion gases to be driven into trench cavities 34 between rows of buckets 12 and nozzle assemblies 14 and, from there, into wheelspace cavities 36 between the wheels 18. To inhibit the ingress of hot combustion gases into the interior regions of the gas turbine, the buckets 12 are commonly equipped with extensions, referred to as angel wings 28, that extend from the shank 26 into the trench cavities 34 in a direction corresponding to the axial direction of the turbine section 10. As represented in FIG. 1, the angel wings 28 cooperate with lands 30 formed on the adjacent nozzle assemblies 14 to create a tortuous path that inhibits the flow of hot gases through the trench cavities 34. Consequently, the angel wings 28 are directly exposed to the hot combustion gases ingested into the trench cavities 34 from the gas path 32. Current practice is to supply the trench cavities 34 with a cooling air flow 33 obtained by air bled from the compressor section (not shown) of the engine for the purpose of keeping the angel wings 28 at temperatures that are sufficiently low to enable the angel wings 28 to meet their creep and fatigue life requirements. However, this purge flow is costly to the overall performance of a gas turbine engine, and therefore any reduction in the cooling air flow 33 needed to protect the angel wings 28 would be advantageous to turbine efficiency.

BRIEF DESCRIPTION OF THE INVENTION

The present invention provides a rotating airfoil component of a turbomachine, and particular a component equipped with one or more angel wings that serve to inhibit the ingress of a working fluid (for example, hot combustion gases of a gas turbine or steam of a steam turbine) into interior regions of the turbomachine.

According to a first aspect of the invention, the component includes an airfoil adapted for impingement by the working fluid of the turbomachine, and means for mounting the component to a rotating component of the turbomachine to enable rotation of the component within the turbomachine. At least one angel wing projects from the component and is adapted to inhibit flow of the working fluid from the airfoil toward the mounting means of the component. The angel wing has a first surface facing the airfoil, an oppositely-disposed second surface facing the mounting means, and at least one lateral surface therebetween. A thermal-insulating coating system is present on the first surface to inhibit heat transfer from the working fluid to the angel wing but not on the second or lateral surfaces so as not to inhibit heat transfer from the second and lateral surfaces of the angel wing.

A technical effect of the invention is the ability to thermally protect an angel wing so that its creep and fatigue life requirements can be met, while allowing for higher operating temperatures within a turbomachine and/or a reduction in cooling air flow used to protect the angel wings.

Other aspects and advantages of this invention will be better appreciated from the following detailed description.

DETAILED DESCRIPTION OF THE INVENTION

Figure 1:
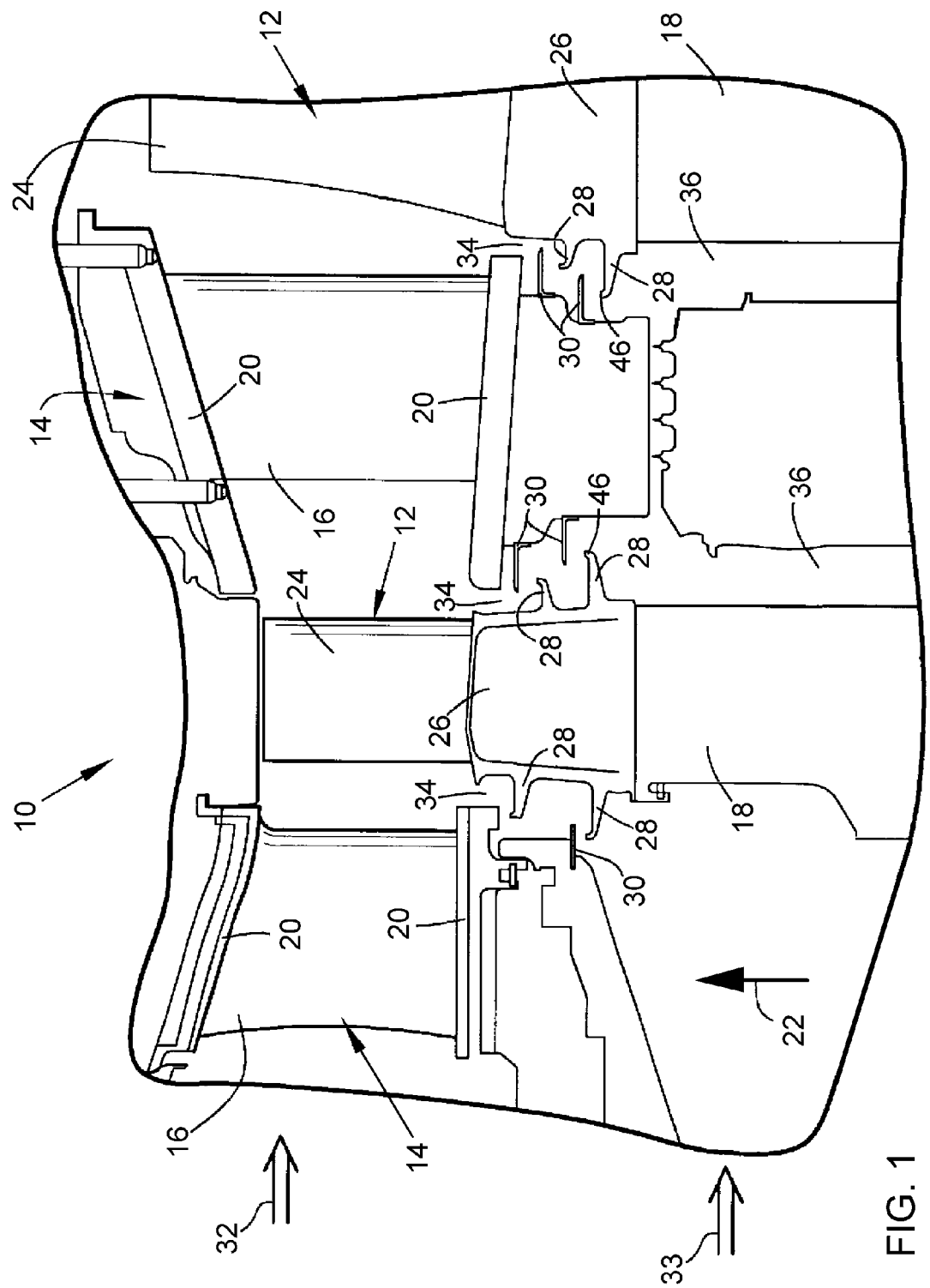
FIG. 1 schematically represents an axial cross-section of a turbine section of a land-based gas turbine engine.

The invention will be described in reference to the turbine section 10 schematically represented in FIG. 1. The previous discussion of FIG. 1 is therefore applicable to the following discussion, which will focus primarily on aspects of the invention that differ from what was previously described in reference to FIG. 1. However, it should be understood that the invention is not limited to the turbine section 10 and its particular configuration represented in FIG. 1. In particular, the invention is not limited to the particular buckets 12 represented in FIG. 1, but is more generally applicable to rotating airfoil components of turbomachines, including but not limited to gas turbines, land-based gas turbine engines, aircraft gas turbine engines, and steam turbines. Furthermore, the invention is not limited to the particular configurations and numbers of the angel wings 28 and lands 30 represented in FIG. 1.

The buckets 12 and components of the nozzle assembly 14 shown in FIG. 1 can be conventionally formed of nickel-, cobalt-, or iron-based superalloys of types suitable for use in gas turbines. Notable but nonlimiting examples include nickel-based superalloys such as GTD-111® (General Electric Co.), GTD-444® (General Electric Co.), IN-738, René™ N4 (General Electric Co.), René™ N5 (General Electric Co.), René™ 108 (General Electric Co.) and René™ N500 (General Electric Co.). The buckets 12 and vanes 16 may be formed as equiaxed, directionally solidified (DS), or single crystal (SX) castings to withstand the high temperatures and stresses to which they are subjected within a gas turbine engine. Melting and casting processes suitable for producing the buckets 12 and vanes 16 are well known and therefore will not be discussed here in any detail.

Figure 2:
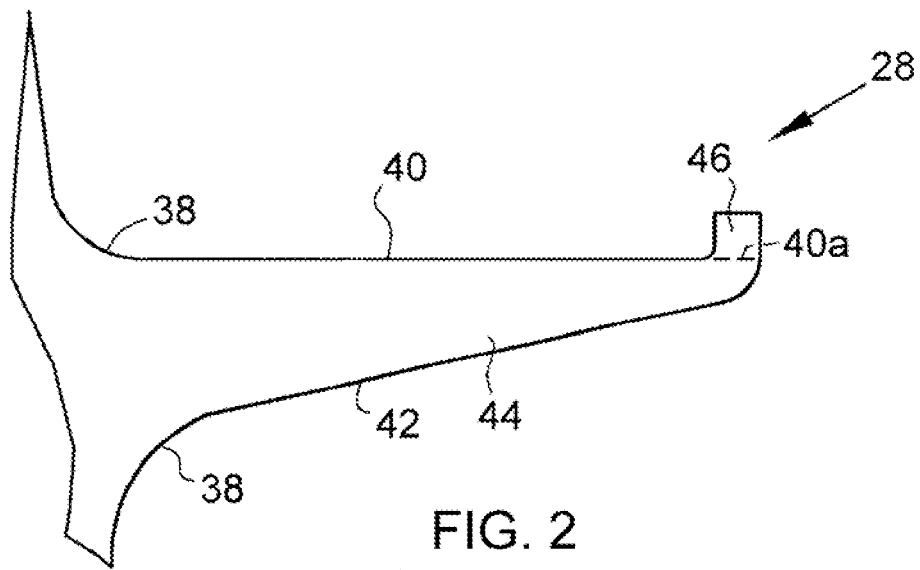
FIG. 2 is a detailed view of an angel wing of the type represented in FIG. 1 and in accordance with the prior art.

As previously described in reference to FIG. 1, in combination with the lands 30, the angel wings 28 serve to inhibit the inward flow of hot combustion gases (working fluid) from the airfoils 24 of the buckets 12, through the trench cavities 34 toward the retention features (typically the dovetails) by which the bucket 12 is anchored to the wheel 18, and into the wheelspace cavities 36. FIG. 2 is a detailed view of an angel wing 28 of the type shown in FIG. 1. The angel wing 28 is typically integrally cast with the remainder of its bucket 12, to which the angel wing 28 is joined through root blends 38 to reduce stress concentrations. As indicated in FIG. 2, the angel wing 28 has radially outward and inward surface 40 and 42 (in relation to the radial direction 22 of the turbine section 10) and oppositely-disposed lateral surfaces 44 (of which only one is visible in FIG. 2) between the outward and inward surfaces 40 and 42. The angel wing 28 terminates at an upturned distal tip 46 that projects from the outward surface 40. As evident from FIG. 1, the distal tip 46 projects toward the airfoil 24 in the radially outward direction 22 of the turbine section 10, such that the tip 46 may be subjected to any rub encounters with the land 30 with which the angel wing 28 cooperates. The presence of an upturned distal tip 46 is advantageous in that the tip 46 can be machined to more closely control the radial height of the angel wing 28 relative to the bucket retention features (dovetails), enabling a narrower gap to be maintained with the corresponding land 30. However, the present invention is also applicable to angel wings whose distal tips are not upturned, i.e., a flat-topped angel wing whose radially outward surface 40a is indicated in phantom in FIG. 2.

As evident from FIG. 1, the angel wing 28 is essentially cantilevered into one of the trench cavities 34 in a direction roughly perpendicular to the radial direction 22 of the turbine section 10, such that its outward surface 40 generally faces the bucket airfoil 24 and its inward surface 42 generally faces the bucket retention features, as well as the wheelspace cavity 36 beyond. With the location and orientation represented in FIG. 1, the angel wing 28 will typically be surrounded by a mixture of the hot combustion gases that enter from the hot gas path 32 and air from the cooling air flow 33 bled from the compressor, with the result that the angel wing 28 tends to be at a rather uniform temperature, though typically with some degree of thermal gradient in the radial direction. As higher operating temperatures are sought to improve the efficiency of the gas turbine, the temperature of the angel wing 28 can rise to levels that unacceptably reduce its creep and fatigue life properties.

Figure 3:
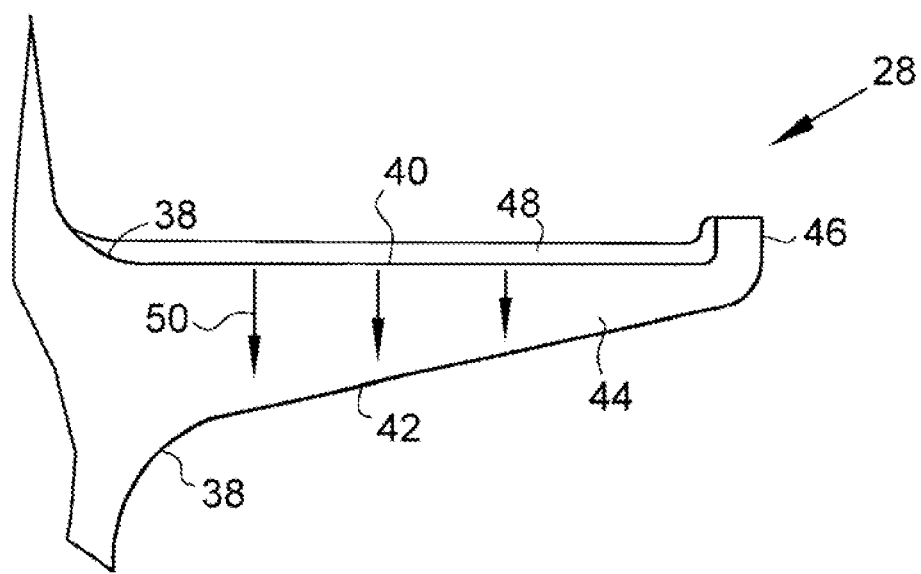
FIGS. 3-6 are detailed views of angel wings of the types represented in FIGS. 1 and 2, but modified to further have a thermal-insulating coating system in accordance with embodiments of the present invention.
Figure 4:
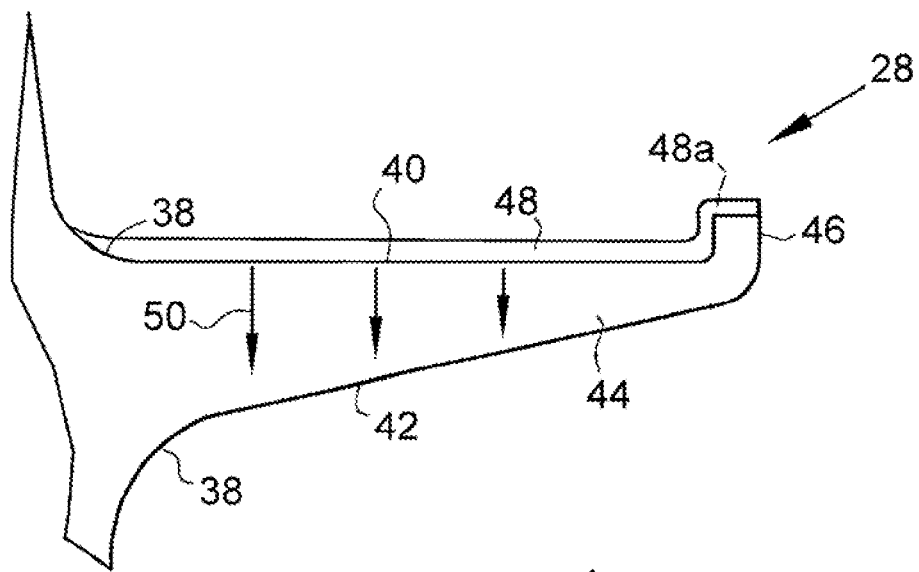
Figure 5:
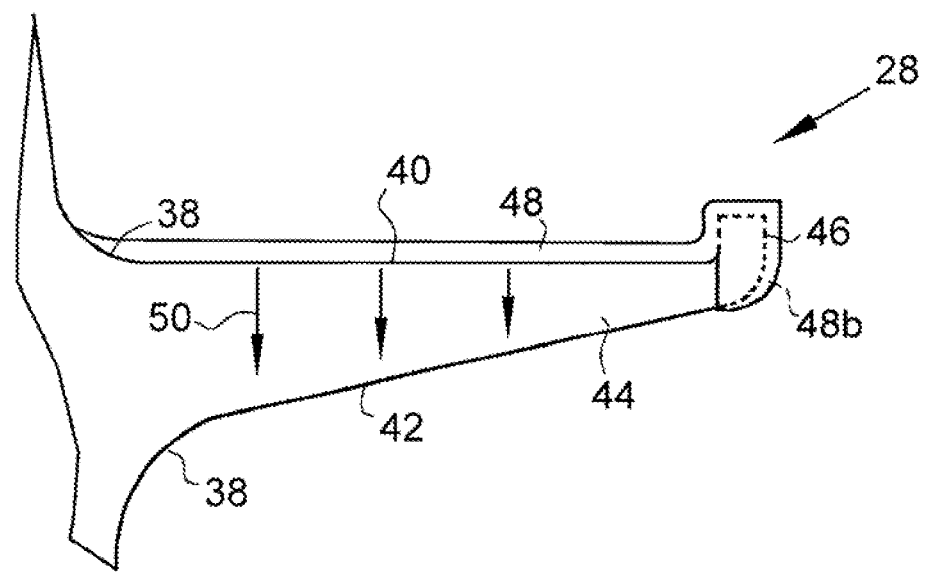
Figure 6:
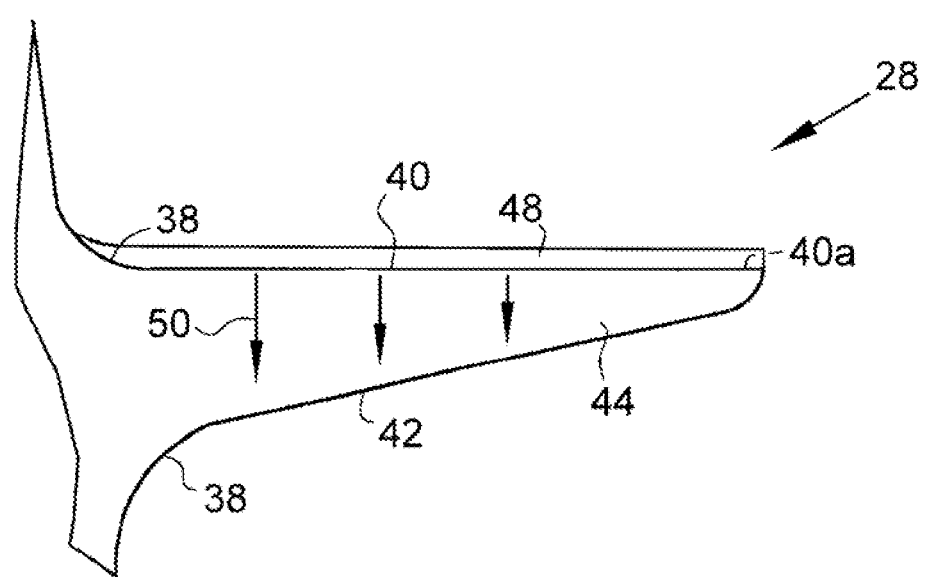

The present invention seeks to reduce the temperature of the angel wing 28 by reducing the heat flux into the angel wing 28 from the combustion gases ingested from the hot gas path 32, and simultaneously take advantage of the high heat transfer coefficients and cooler air from the cooling air flow 33. The invention does so by thermally insulating the radially outward surface 40 of the angel wing 28, but not the inward or lateral surfaces 42 and 44 of the angel wing 28, with a thermal-insulating coating system 48, as represented in FIG. 3. In this manner, heat transfer from the hot combustion gases to the angel wing 28 can be reduced without reducing the ability of the angel wing 28 to transfer heat to the cooling air flow 33. As represented in FIG. 3, in addition to being absent on the inward and lateral surfaces 42 and 44, the coating system 48 is preferably not present on the distal tip 46 of the angel wing 28, and therefore is not subjected to any rub encounters with the land 30. However, as represented in FIG. 4 at 48a, it is also within the scope of the invention that the coating system 48 is deposited to also cover the radially outward surface of the distal tip 46, whether configured to be upturned or flat-topped, such that the coating system 48 covers the entire radially outward surface of the angel wing 48. The coating system 48 may also be deposited to fully wrap around only the distal tip 46 such that lateral and distal surfaces of the distal tip 46 are covered, as represented in FIG. 5 at 48b. Finally, FIGS. 3-6 represent the coating system 48 as extending upward slightly over the radially-outward root blend 38 toward the airfoil 24.

The coating system 48 that protects the radially outward surface 40 of the angel wing 28 can be of a type known in the art. Such systems, referred to as thermal barrier coating (TBC) systems, entail a low-conductivity thermal barrier coating (TBC) that is typically adhered to a substrate surface with a suitable bond coat. Typical but nonlimiting TBC materials for the coating system 48 are ceramic materials, a notable example of which is zirconia partially or fully stabilized with yttria (YSZ) or another oxide such as magnesia, ceria, scandia and/or calcia, and optionally other oxides to reduce thermal conductivity. A suitable thickness for the TBC is generally on the order of about 0.003 to about 0.050 inch (about 75 to about 1250 micrometers), with the upper limit intended to minimize the additional weight attributable to the TBC that could increase stresses in the angel wing 28. Suitable techniques for depositing the TBC material include air plasma spraying (APS), suspension plasma spraying (SPS), electron beam physical vapor deposition (EB-PVD), plasma spray-physical vapor deposition (PS-PVD), etc. Masking can be used to prevent over-spray on surface regions that are not intended to be coated.

The coating system 48 preferably includes a metallic bond coat to promote the adhesion of the TBC material, whose ceramic composition results in a thermal expansion mismatch with the metallic composition of the angel wing 28. Because the TBC material that provides a desired insulating effect may offer little resistance to oxidation, erosion, and corrosion, preferred bond coats are also capable of environmentally protecting the underlying outward surface 40 of the angel wing 28. The ability of the bond coat to adhere the ceramic TBC and protect the underlying angel wing surface 40 can be promoted through the formation of an adherent oxide scale, such as a thin layer of aluminum oxide (alumina), on its surface, which chemically bonds the ceramic TBC to the bond coat. For this purpose, various bond coat materials have been proposed, notable examples of which have aluminum-rich compositions, including diffusion coatings that contain aluminum intermetallics (predominantly beta-phase nickel aluminide (β-NiAl) and platinum aluminides (PtAl)), and overlay coatings such as MCrAlX (where M is iron, cobalt and/or nickel, and X is yttrium, one or more rare earth metals, and/or one or more reactive metals), of which CoNiCrAlY and NiCrAlY are two notable examples. A suitable thickness for the bond coat is generally on the order of about 0.001 to about 0.015 inch (about 25 to about 380 micrometers). Suitable techniques for depositing the bond coat include APS, low pressure plasma spraying (LPPS, also referred to as vacuum plasma spaying, or VPS), high velocity air-fuel (HVAF) deposition, high velocity oxy-fuel (HVOF) deposition, ion plasma deposition (IPD, also called cathodic arc deposition), cold spraying, wire arc spraying, plating, etc.

By applying the coating system 48 to only the outward surface 40 of the angel wing 28, and not to its inward or lateral surfaces 42 and 44, the angel wing 28 is partially insulated from the hot combustion gases that are ingested from the hot gas path 32 and predominately encountered by the outward surface 40. As such, the coating system 48 reduces the heat flux 50 into the angel wing 28 that would otherwise occur through its outward surface 40, but does not insulate the inward and lateral surfaces 42 and 44 that predominantly encounter the cooling air flow 33 and therefore does not provide a barrier to heat transfer from these surfaces 42 and 44 to the cooling air flow 33. Analytical investigations have indicated that locating the coating system 48 solely on the outward surface 40 of the angel wing 28 is capable of reducing the nominal temperature of an angel wing by roughly one hundred degrees Celsius or more. Consequently, it may be possible to increase the operating temperature of an engine corresponding to higher combustion gas temperatures) or reduce the cooling air flow 33 (corresponding to higher temperatures within the wheelspace cavities 36) while maintaining the angel wing 28 at a temperature compatible with meeting the required creep and fatigue life properties of the angel wing 28.

While the invention has been described in terms of particular embodiments, it is apparent that other forms could be adopted by one skilled in the art. Therefore, the scope of the invention is to be limited only by the following claims.

The invention claimed is:

1. A rotating airfoil component of a turbomachine, the rotating airfoil component being mounted at a lowermost portion of the rotating airfoil component to a rotating component of the turbomachine to enable rotation of the rotating component within the turbomachine, the rotating airfoil component comprising:
an airfoil adapted for impingement by a working fluid of the turbomachine; and
at least one angel wing projecting from the rotating airfoil component and adapted to inhibit flow of the working fluid from the airfoil toward the lowermost portion of the rotating airfoil component, the angel wing having a main portion having a first surface facing the airfoil, an oppositely-disposed second surface facing the lowermost portion, at least one lateral surface therebetween, the angel wing having a distal tip portion at a distal end of the angel wing, the distal tip portion having a first surface facing the airfoil, and a thermal-insulating coating system on the first surface of the main portion to inhibit heat transfer from the working fluid to the angel wing but not on the second and lateral surfaces of the main portion so as not to inhibit heat transfer from the second and lateral surfaces of the main portion of the angel wing.

2. The rotating airfoil component according to claim 1, wherein the turbomachine is a gas turbine engine, the rotating airfoil component is a bucket, and the working fluid is combustion gases.

3. The rotating airfoil component according to claim 1, wherein the coating system comprises a ceramic coating.

4. The rotating airfoil component according to claim 3, wherein the ceramic coating has a composition consisting of zirconia partially or fully stabilized with yttria.

5. The rotating airfoil component according to claim 3, wherein the coating system further comprises a metallic bond coat that adheres the ceramic coating to the first surface of the angel wing.

6. The rotating airfoil component according to claim 5, wherein the bond coat has an aluminum-rich composition chosen from the group consisting of diffusion coatings that contain aluminum intermetallics and MCrAlX overlay coatings where M is iron, cobalt and/or nickel, and X is yttrium, one or more rare earth metals, and/or one or more reactive metals.

7. The rotating airfoil component according to claim 1, wherein the angel wing terminates at a distal tip that projects from the first surface of the distal tip portion of the angel wing toward the airfoil thereof, and the coating system is not on the distal tip.

8. The rotating airfoil component according to claim 1, wherein the angel wing terminates at an upturned distal tip that projects from the first surface of the distal tip portion of the angel wing toward the airfoil thereof, and a portion of the coating system completely covers a radially outward surface of the upturned distal tip.

9. The rotating airfoil component according to claim 1, wherein the angel wing terminates at an upturned distal tip that projects from the first surface of the distal tip portion of the angel wing toward the airfoil thereof, and a portion of the coating system completely covers lateral and distal surfaces of the upturned distal tip.

10. The rotating airfoil component according to claim 1, wherein the angel wing terminates at a flat-topped distal tip on the first surface of the distal tip portion, and a portion of the coating system covers a radially outward surface of the flat-topped distal tip.

11. The rotating airfoil component according to claim 1, wherein the angel wing defines a radially-outward root blend with the rotating airfoil component, and the coating system covers the radially-outward root blend.

12. The rotating airfoil component according to claim 1, wherein the rotating airfoil component is mounted to the rotating component of the turbomachine so that the airfoil of the rotating airfoil component extends in a radially outward direction of the turbomachine, the rotating airfoil component is axially adjacent a nozzle assembly of the turbomachine, the rotating airfoil component and the nozzle assembly define a trench cavity therebetween, and the angel wing cooperates with a land of the nozzle assembly to define a tortuous path through the trench cavity.

13. The rotating airfoil component according to claim 12, wherein the angel wing is cantilevered from the rotating airfoil component in a direction perpendicular to the radially outward direction of the turbomachine.

14. The rotating airfoil component according to claim 12, wherein the turbomachine is a gas turbine engine, the rotating airfoil component is a bucket, and the working fluid is combustion gases.

15. The rotating airfoil component according to claim 12, wherein the coating system comprises a ceramic coating.

16. The rotating airfoil component according to claim 15, wherein the ceramic coating has a composition consisting of zirconia partially or fully stabilized with yttria.

17. The rotating airfoil component according to claim 15, wherein the coating system further comprises a metallic bond coat that adheres the ceramic coating to the first surface of the angel wing.

18. The rotating airfoil component according to claim 17, wherein the bond coat has an aluminum-rich composition chosen from the group consisting of diffusion coatings that contain aluminum intermetallics and MCrAlX overlay coatings where M is iron, cobalt and/or nickel, and X is yttrium, one or more rare earth metals, and/or one or more reactive metals.

19. The rotating airfoil component according to claim 12, wherein the angel wing terminates at an upturned distal tip that projects from the first surface of the distal tip portion of the angel wing toward the land of the nozzle assembly, and the coating system is not on the upturned distal tip.

20. The rotating airfoil component according to claim 12, wherein the angel wing terminates at a distal tip of the distal tip portion, and a portion of the coating system completely covers a radially outward surface, a lateral surface, and/or a distal surface of the distal tip.

* * * * *